(12) United States Patent
Kim et al.

(10) Patent No.: US 7,342,346 B2
Kim et al.
(45) Date of Patent: Mar. 11, 2008

(54) MICROFABRICATED VERTICAL COMB ACTUATOR USING PLASTIC DEFORMATION

(75) Inventors: Jongbaeg Kim, Richmond, CA (US); Liwei Lin, Castro Valley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/381,035

(22) Filed: May 1, 2006

(65) Prior Publication Data

US 2006/0208608 A1    Sep. 21, 2006

Related U.S. Application Data

(62) Division of application No. 10/851,543, filed on May 20, 2004, now Pat. No. 7,089,666.

(60) Provisional application No. 60/476,534, filed on Jun. 6, 2003.

(51) Int. Cl.
*H02N 1/00* (2006.01)
*G02B 26/08* (2006.01)

(52) U.S. Cl. .................... 310/309; 359/224; 359/291

(58) Field of Classification Search ................ 310/309; 359/223–226, 290, 291
See application file for complete search history.

(56) References Cited

U.S. PATENT DOCUMENTS

| | | | | |
|---|---|---|---|---|
| 5,969,848 A * | 10/1999 | Lee et al. | ................ | 359/298 |
| 6,261,494 B1 | 7/2001 | Zavracky et al. | .......... | 264/104 |
| 6,315,423 B1 * | 11/2001 | Yu et al. | ................ | 359/872 |
| 6,498,870 B1 | 12/2002 | Wu et al. | ................ | 385/18 |
| 6,526,198 B1 | 2/2003 | Wu et al. | ................ | 385/18 |
| 6,672,732 B1 * | 1/2004 | Niendorf et al. | ........... | 359/877 |
| 6,713,367 B2 * | 3/2004 | Solgaard et al. | ........... | 438/459 |
| 6,822,776 B2 | 11/2004 | Hah et al. | ................ | 359/224 |
| 7,089,666 B2 * | 8/2006 | Kim et al. | ................ | 29/896.9 |
| 2003/0007262 A1 * | 1/2003 | Tsuboi et al. | ............. | 359/847 |
| 2004/0245871 A1 * | 12/2004 | Kim et al. | ............... | 310/75 A |
| 2005/0013087 A1 | 1/2005 | Wu et al. | ................ | 361/303 |

(Continued)

FOREIGN PATENT DOCUMENTS

EP           1098170        *  5/2001

(Continued)

OTHER PUBLICATIONS

"Scanning micromirror with angular comb drive actuation"; Patterson et al., MEMS 2002 : micro electro mechanical systens (Las Vegas NV, Jan. 20-24, 2002).*

(Continued)

*Primary Examiner*—Karl Tamai
(74) *Attorney, Agent, or Firm*—Beyer Weaver LLP

(57) ABSTRACT

A microfabricated actuator of the vertical comb-drive (AVC) type or staggered vertical comb-drive type for torsional or linear applications includes torsion springs which permit self-aligned deformation of the device (micromirror) structure of the actuator through the heating of the torsional springs to plasticity. The torsional springs can include perpendicular-beam springs or double folded beams which allow axial movement of the spring when heated. Heating of the springs can be by bulk heating of the actuator structure or by Joule heating to the torsional springs by passing an electrical current therethrough.

10 Claims, 15 Drawing Sheets

U.S. PATENT DOCUMENTS

2005/0162806 A1  7/2005  Sarkar et al. ............... 361/277
2006/0208608 A1* 9/2006  Kim et al. .................. 310/309

FOREIGN PATENT DOCUMENTS

WO        WO 01/00187    *  6/2002

OTHER PUBLICATIONS

Kim et al., "Batch-Fabricated Scanning Micromirrors Using Localized Plastic Deformation of Silicon", MEMS 2004 Conference Proceedings, Jan. 2004, 4 pages.

Kim, et al., "Microfabricated Torsional Actuator Using Self-Aligned Plastic Deformation", Transducers 2003 Conference Proceeding, Jun. 9, 2003, 4 pages.

Zou, et al., "Plastic Deformation Magnetic Assembly (PDMA) of 3D Microstructures: Technology Development and Application", The 11th International Conference on Solid-State Sensors and Actuators, Munich, Germany, Jun. 10-14, 2001.

Tuck, et al., "A Study of Creep in Polysilicon MEMS Devices", Journal of Engineering Materials and Technology, vol. 127, Issue 1, Jan. 2005. Abstract.

Fukuta, et al., "Microactuated Self-Assembling of 3D Polysilicon Structures with Reshaping Technology", Proc IEEE Micro Electro Mechanical Systems (MEMS), pp. 477-481, 1997.

Fukuta, et al., "A Reshaping Technology with Joule Heat for Three Dimensional Silicon Structures", 8th Intl. Conf. on Solid-State Actuators and Eurosensors, pp. 174-177, 1995.

Yang et al., "Reshaping of Single-Crystal Silicon Microstructures", Jpn. J. Appl. Phy. vol. 38, pp. 1580-1583, 1999.

* cited by examiner

Mag = 105 X   100µm   EHT = 5.00kV   Signal A = SE2
                     WD = 7 mm       Photo No. = 12

Mag = 41 X    200µm   EHT = 5.00kV   Signal A = SE2
                      WD = 15 mm     Photo No. = 42

■ Position of pillar structures    ▨ Anchor    ▩ Electrode for localized plastic deformation (also Anchor)

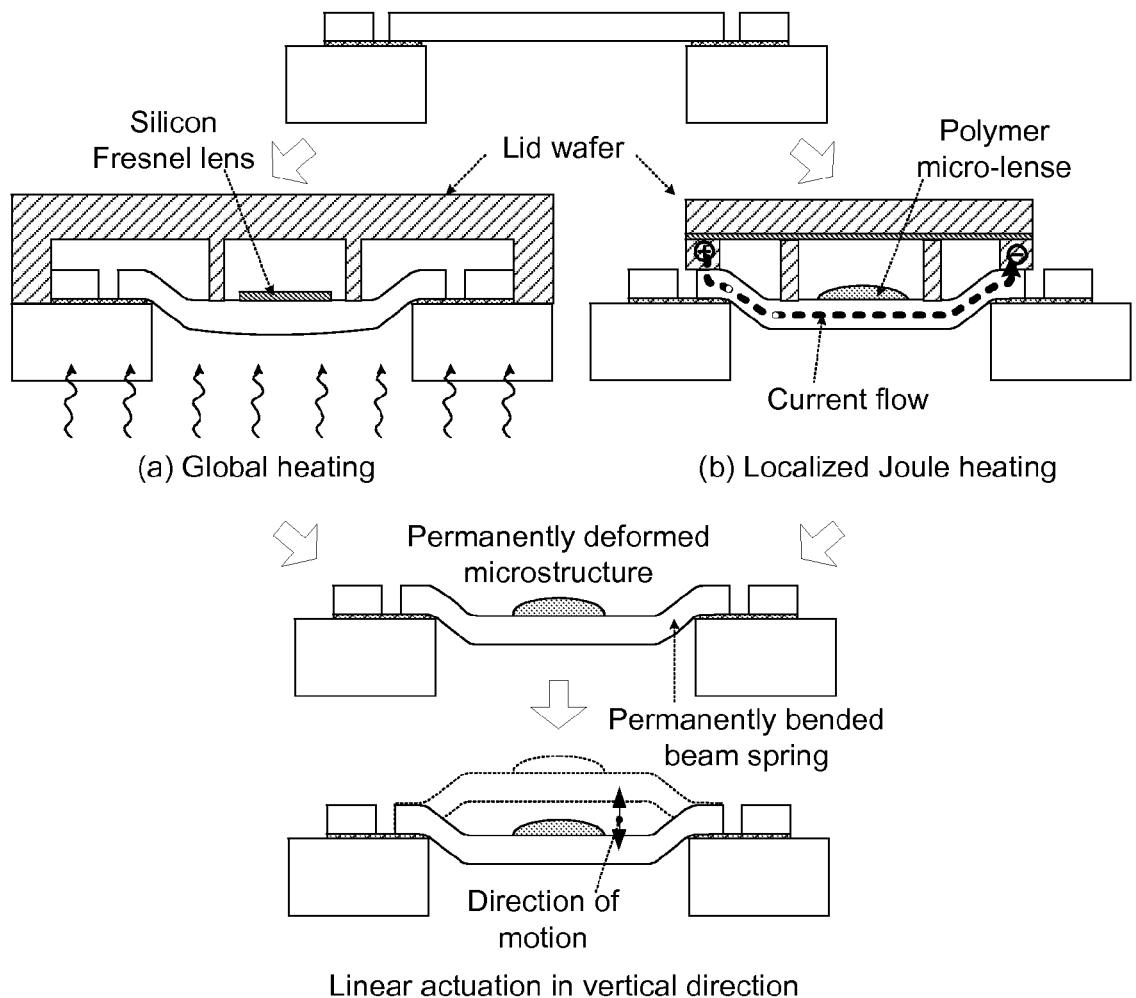
FIG. 22
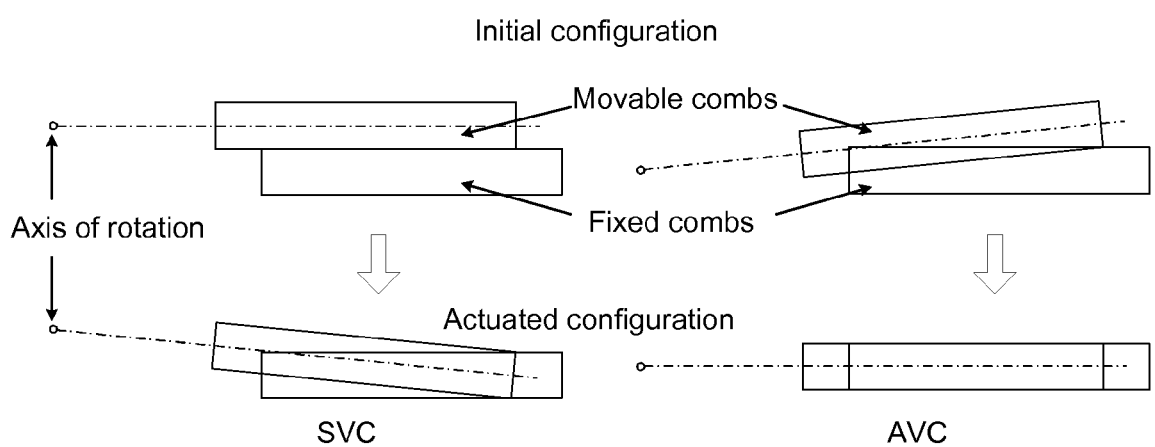
FIG. 23A      FIG. 23B

MICROFABRICATED VERTICAL COMB ACTUATOR USING PLASTIC DEFORMATION

CROSS-REFERENCE TO RELATED APPLICATIONS

This patent application is a divisional of U.S. patent application Ser. No. 10/851,543, filed May 20, 2004 now U.S. Pat. No. 7,089,666. The parent application claims the benefit of U.S. Provisional Patent Application Ser. No. 60/476,534, filed Jun. 6, 2003. Both applications are incorporated herein by reference for all purposes.

STATEMENT REGARDING FEDERALLY SPONSORED RESEARCH OR DEVELOPMENT

This invention was made with Government funding under Grant (Contract) No. ECS0096098 awarded by the National Science Foundation. The Government has certain rights to this invention.

BACKGROUND OF THE INVENTION

This invention relates generally to microelectromechanical systems (MEMS), and more particularly the invention relates to torsional and linear vertical comb MEMS actuators and to the microfabrication of the actuator.

Electrostatic comb-drive actuators are used in numerous MEMS applications where they have demonstrated their capability for extended ranges-of-movement, stable and reliable operation, and design flexibility in different frequency ranges. In particular, many optical MEMS applications employ comb-drive actuators for torsional and linear motions. For example, lateral comb-drives and mechanical hinges or linkages made of polysilicon or single-crystal silicon have been demonstrated to make torsional actuators. From these applications, linkage- and hinge-designs have been identified as sources for reliability problems and for limitations on maximum frequencies of operation. One design for torsional actuators uses vertically aligned comb-drives to achieve both higher frequencies and larger scan angles than those characterizing the planar polysilicon structures. Other vertically aligned comb-drives have employed polysilicon on SOI and single-crystal silicon fabricated using wafer bonding.

FIG. 10 is a plan view of an Angular Vertical Comb-drive (AVC) actuator including a device structure 10 (micromirror for example) which is supported by torsion springs 12 on a support layer 14. Typically, layer 14 is a silicon on insulator (SOI) layer and device structure 10 and torsion springs 12 are fabricated therefrom by conventional photoresist masking and etching techniques. Comb-drive actuators 16 comprising stationary comb fingers on support layer 14 and interdigitated moveable comb fingers on device structure 10 rotatably move device structure 10 on torsion springs 12 in response to electrical drive signals applied to the comb fingers on device structure 10 through electrical contacts 18.

The basic fabrication processes for AVCs and SVCs (Staggered Vertical Comb-drive) are first to define the stationary and movable comb structures on the same level of silicon layer, and to deflect either the stationary comb structure by the residual stress induced by a metal layer, or else the movable comb structure using the surface-tension force that arises as a result of the reflow of a patterned-photoresist layer. A limitation of the residual-stress method of fabrication is that the structure must be sufficiently flexible so that it undergoes appreciable deformation. Designs that meet this requirement are generally limited in their ultimate operating frequencies to a few hundreds Hertz, Hz. The challenging problems for the reflow of polymer hinges have been the control and reliability of the polymer material.

To improve the performance of torsion-bar micro-actuators, AVC-type torsional actuators that are composed of all-single-crystal-silicon structures have been fabricated using controlled-plastic-deformation in silicon that is annealed at elevated temperatures. In recent years, polysilicon and single-crystal silicon membranes were demonstrated to be plastically deformed forming hemispherical domed structures as a result of the pressures of heated gases trapped in a cavity. Plastically deformed polysilicon structures have been used in a self-assembled MEMS process.

The present invention is directed to a vertical comb type actuator with novel torsion springs and to a novel method of fabricating the AVC and SVC type actuator including thermal processing of the torsion springs to cause a permanent deflection of the device structure relative to the support structure.

SUMMARY OF THE INVENTION

In accordance with the invention a vertical comb-drive actuator (AVC and SVC) has unique torsion springs which when heated allow permanent deflection of the device structure of the actuator relative to the support structure.

In fabricating the actuator, the torsion springs are heated to realize plasticity in the springs, and then the device structure is deflected on the torsion springs relative to the device structure. The actuator can be bulk heated or an electrical current can be passed through the torsion springs for Joule heating of the springs. A self-aligned deflection of the device structure is realized by applying a lid cap with extending pillar to the actuator with the pillar deflecting the heated device structure. The heated device structure is cooled and then the lid cap is removed with the device structure permanently deflected on the support structure.

The invention and objects and features thereof will be more readily apparent from the following detailed description and the appended claims when taken with the drawings.

BRIEF DESCRIPTION OF THE DRAWINGS

FIG. 22 is a process flow diagram illustrating use of global heating and localized Joule heating in fabricating a linear actuator in accordance with the invention.

FIGS. 23A, 23B illustrate staggered vertical comb-drive and angular vertical comb-drive, respectively.

DETAILED DESCRIPTION OF ILLUSTRATED EMBODIMENTS

Figure 1:
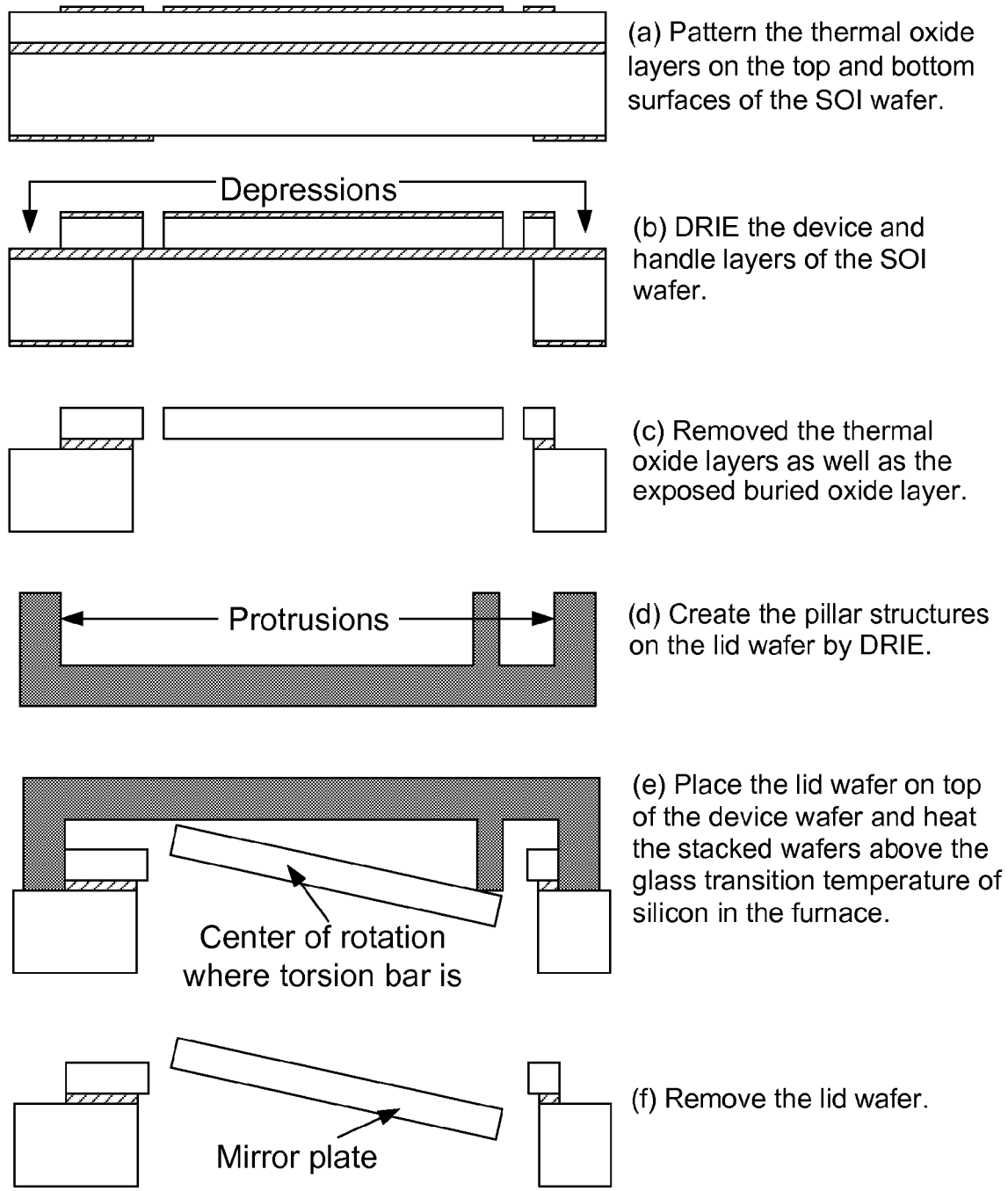
FIG. 1 illustrates a process flow for plastically deforming vertical actuators in accordance with an embodiment of the invention.

The design and fabrication of torsion-bar-supported scanning mirrors in accordance with the invention are demonstrated as an example of vertical-comb actuators made by the plastic-deformation process. FIG. 1 shows the new process. A torsion-bar-supported plate (which may, for example, function as a mirror) is formed in a first wafer. Using deep reactive ion etching, or DRIE, projecting pillars are configured in a second wafer and positioned such that, when the two wafers are stacked together, the projecting pillars push on and depress the mirrors on the first wafer. The two stacked wafers are annealed at temperatures greater than 800° C. causing the torsion bar to be plastically strained so that, after cooling to room temperature and separating the two wafers, the mirrors are permanently tilted from their original planar positions.

To start the process, the top- and bottom-combs and mirror plates are initially defined on the same device layer of an SOI wafer in FIG. 1 (a)~(c). During the DRIE (Deep Reactive Ion Etching) step, not only the actuator itself, but also the depressions are formed. The backside etching of the substrate wafer underneath the mirror and combs removes sufficient silicon to provide clearance for the mirror motion. This backside alignment is not critical and even tens of microns of alignment errors are acceptable. A second wafer is processed with protrusions that align to depressions in the comb-actuator wafer. A second wafer is configured with pillars that displace the comb structures to the desired tilt angles. The two mated wafers are annealed in a furnace at 800~900° C. When they are separated, the comb actuators are plastically deformed as shown in FIG. 1(f). Throughout the whole process, no critical alignment is necessary. Top and bottom combs are self-aligned because they are defined in a single masking step, and device and lid wafers are also self-aligned due to the depressions and protrusions.

Figure 2:
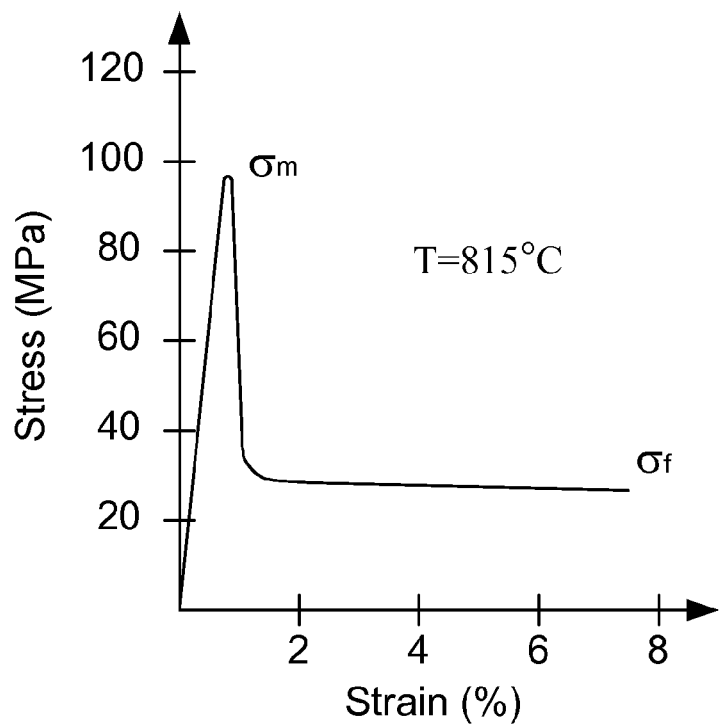
FIG. 2 is a graph illustrating stress-strain curve of silicon at an elevated temperature.

In FIG. 2, a typical stress-strain curve of single crystal silicon at high temperature is shown. At room temperature, silicon is specified as a brittle material with a yield stress of ~600 MPa. At an elevated temperature, the mechanical properties of silicon change dramatically. The maximum yield stress ($\sigma_m$) decreases due to the increased mobility of dislocations in the crystal. At a temperature above 600° C., the structures begin to plastically deform with a much reduced flow stress ($\sigma_f$; the stress needed to continue plastic deformation) instead of fracture when the induced stress in the silicon structure exceeds the yielding stress. When the pillar structure on the lid wafer pushes one edge of the mirror surface, the mirror and moving combs rotate on the torsional springs inducing stresses greater than σm in the springs by elastic deformation. Stresses are also induced in the mirror plate; however, the magnitude of the stress in the mirror is much smaller than $\sigma_m$ or $\sigma_f$ according to finite-element analysis and negligible compared to that in the torsional springs. Once the temperature is increased, the stresses in the torsional springs are relieved causing their plastic deformation. No deformation of the mirror plate is observed for the annealing temperature of 800~900° C.

Figure 3:
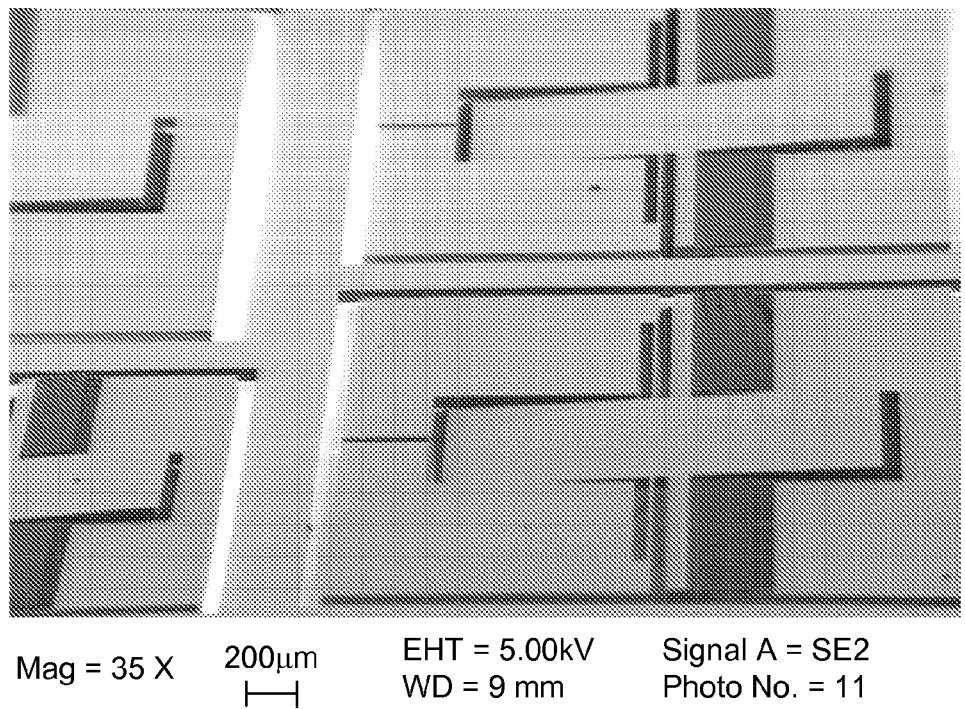
FIG. 3 is a photograph illustrating batch processed scanning mirrors using plastic deformation of silicon in accordance with the invention.
Figure 4:
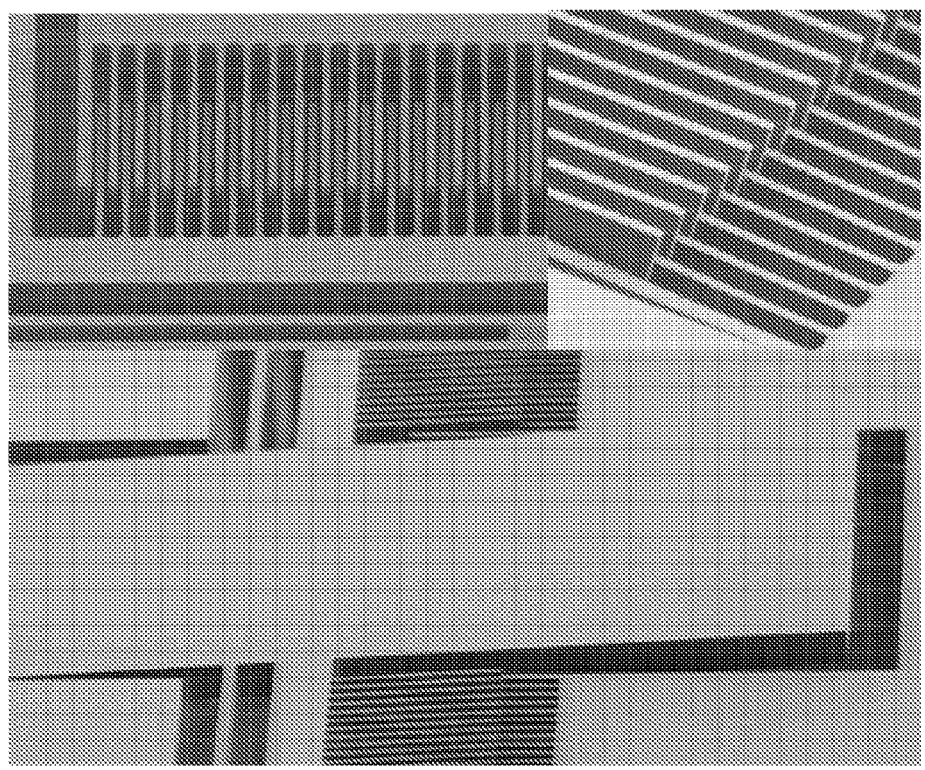
FIG. 4 is a photograph illustrating thermo-plastically tilted mirror and precisely aligned vertical combs.
Figure 5:
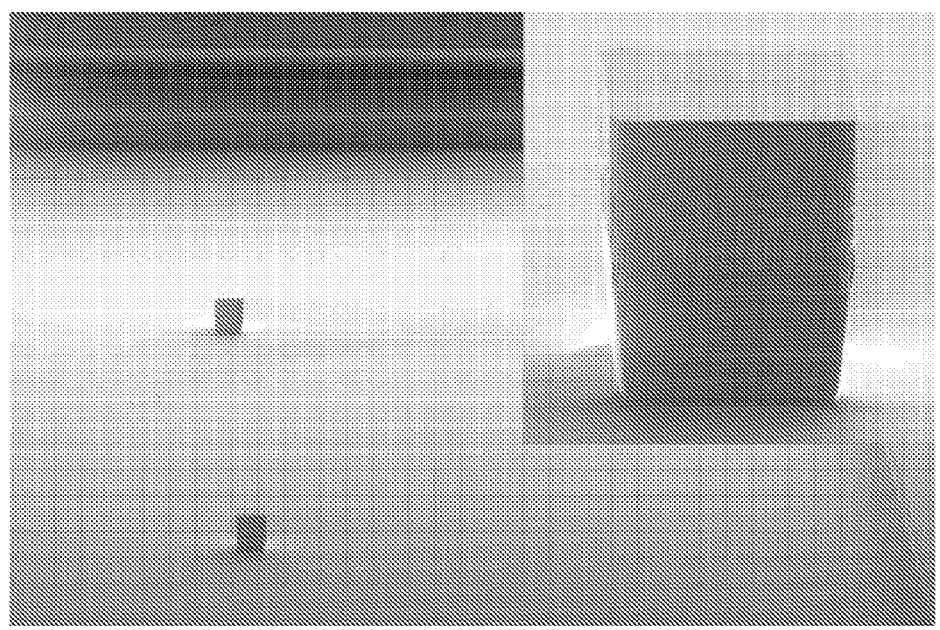
FIG. 5 is a photograph of micro-pillar structures fabricated on a lid wafer.

FIG. 3 is an SEM microphotograph of batch-fabricated micromirrors produced by this process. A close-up view of tilted comb fingers is presented in FIG. 4, showing the precisely aligned vertical comb sets. FIG. 5 shows the lid wafer and pillar structures used to deform the microactuators in FIG. 3. No damage in the pillars or lid wafer was observed indicating that the lid wafer could be used repeatedly.

The maximum initial tilt angle that can be formed by the method of plastic deformation that we have described above is limited by the fracture strength of the single-crystal silicon. We have found that 20~30° of initial angular displacement is possible with a precise value depending on the specific torsion-bar geometry. There are two ways to control the initial tilting angle; (1) by adjusting the height of the pillar structure, and (2) by changing the position on the mirror where the pillar structure pushes as can be seen in FIG. 6.

Figure 6A:
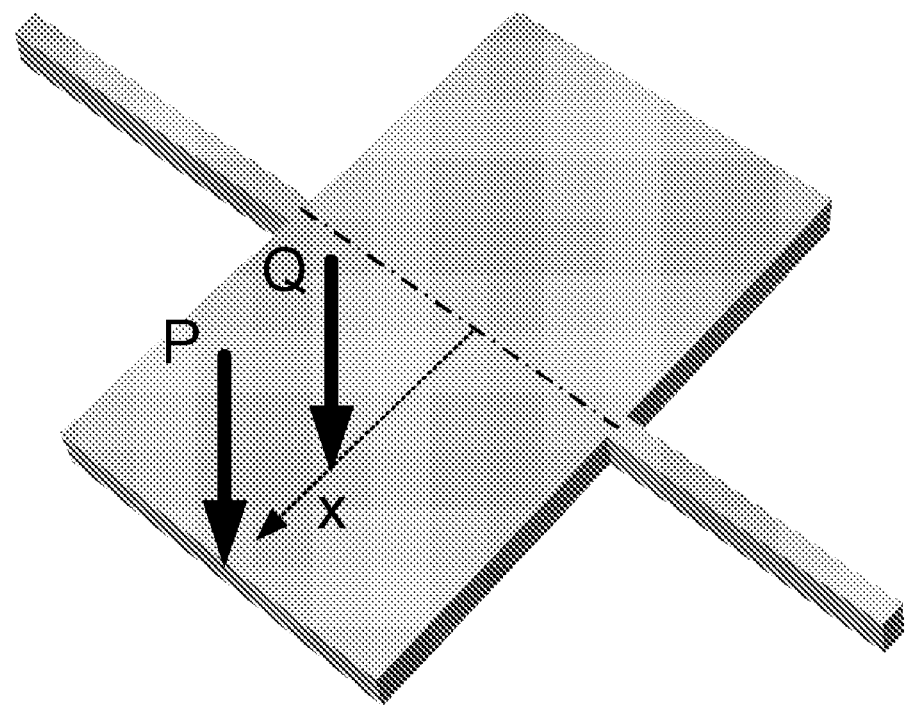
FIG. 6A, 6B illustrate different forces applied on a device structure depending on the position and height of the pillar structure.
Figure 6B:
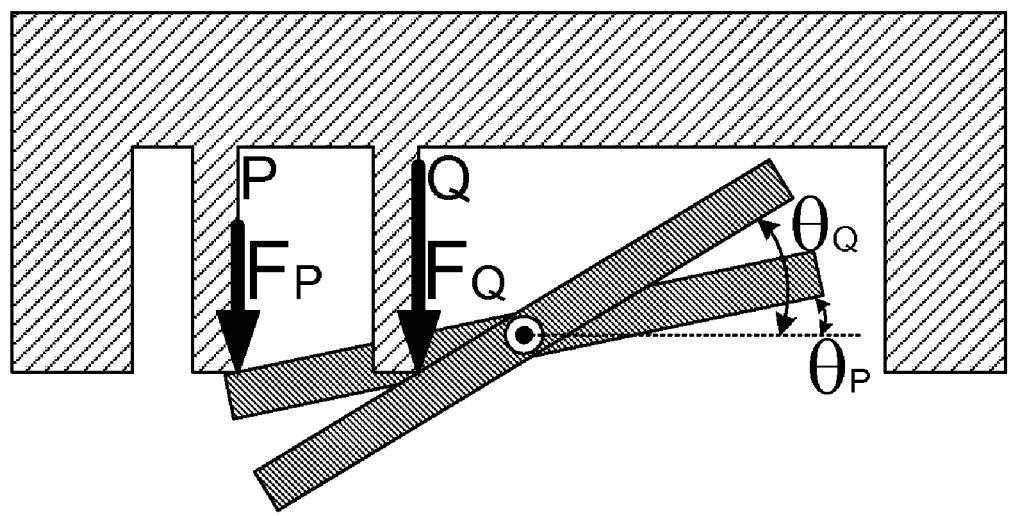

Before high-temperature annealing, when the same height of pillar structure is used, forcing the mirror structure at position Q in FIG. 6 causes a larger tilt than if the pillar were at position P. The tilt in the second case would, however, be the same if the pillar height were sufficiently increased. Although the tilt angle is the same in these two cases, however, the stresses induced in the torsion bar are not equal. The same angle means the same moment is applied to the torsion bar at position P and Q, and that is $$M_P = F_P x_P = M_Q = F_Q x_Q \quad (1)$$

and considering the stiffness of torsion bar, $$M_P = M_Q = c\frac{GJ\theta}{l} \quad (2)$$

therefore, $$F_P = c\frac{GJ\theta}{lx_P} < F_Q = c\frac{GJ\theta}{lx_Q} \quad (3)$$

where G is the shear modulus of torsion bar, J is the polar moment-of-inertia of the torsion bar, l is the length of the torsion bar, and c is a constant depending on the cross-sectional aspect ratio of the torsion bar.

From Eq. (3), it is obvious that pushing the mirror tip with a longer pillar causes smaller vertical force than pushing the position closer to the torsion bar with a shorter pillar. Because excessive vertical force on the mirror surface may lead not only to the torsion, but also to unwanted bending of the torsion bar or undesirable curvature of the mirror, it is desirable that the pillar structures are designed to be placed at the tip of the mirrors. The measured vertical deflections of torsion bars after plastic deformation were less than 0.3 μm, and the measured radii-of-curvature of the mirrors were in the order of meters, which indicate there can be only very little plastic deformation induced in the mirror plate.

Figure 7:
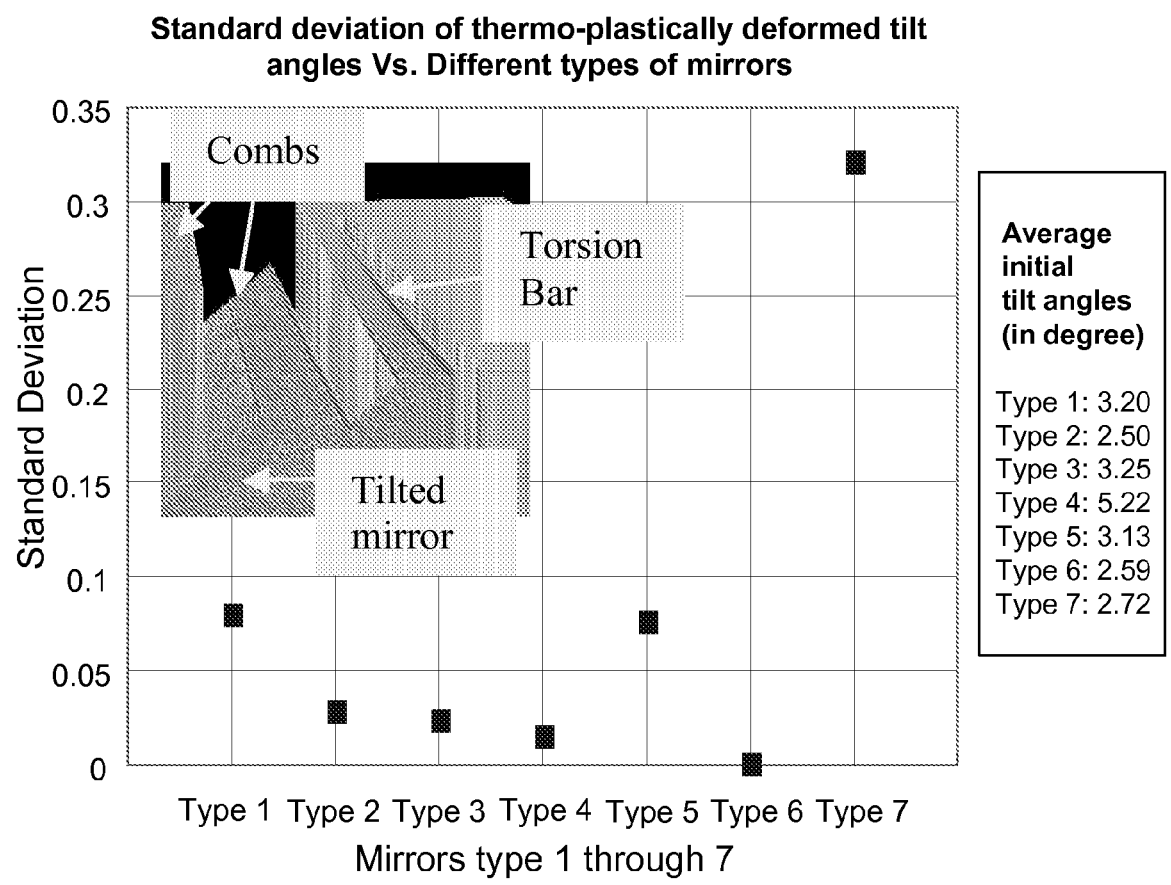
FIG. 7 is a graph illustrating standard deviation of plastically formed tilting angles for mirrors of difference sizes and shapes.

Considering that actuators are made in a batch, the uniformity of the plastic deformations is another parameter to be characterized. The plastically deformed angles of seven different designs were measured and the standard deviations for 10 samples of each type with respect to the average values are plotted in FIG. 7. The typical standard deviation is less than 0.1°. Possible sources of deviation are; particles entrapped between the device wafer and lid wafer, or the tolerance for self-alignment between the depression on the device wafer and the protrusion on the lid wafer, which can be easily improved by mating the lid and device wafers with more tight tolerances and in a cleaner environment.

The measured resonant frequencies of seven different types of actuators with different sizes of torsion bars, mirrors and comb fingers range from 1.90 kHz to 5.33 kHz. The dynamic performance of the type-4 actuator with the initial tilt angle of 5.22° is measured and presented in FIG. 8. Data were collected using 40Vdc and 13Vac drive for the mirror actuator with 50 μm thickness of both fixed and moving combs and a mirror size of 800 mm'800 mm. The resonant frequency is measured at 2953 Hz, and a maximum scanning angle of 19.2° is achieved. The quality factor measured (in air) is 120.

Figure 8:
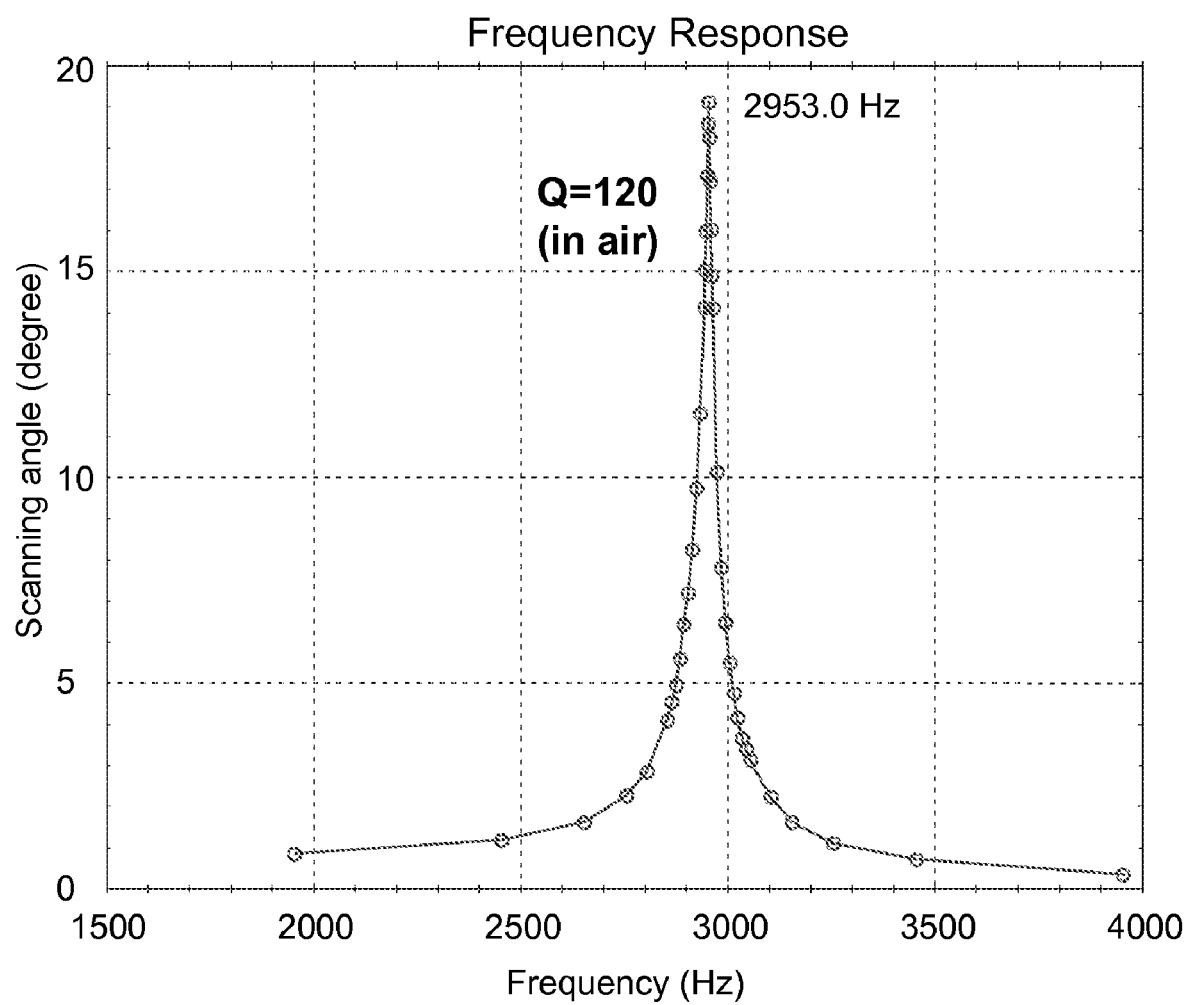
FIG. 8 is a graph illustrating frequency response of a microactuator versus scanning angle.
Figure 9:
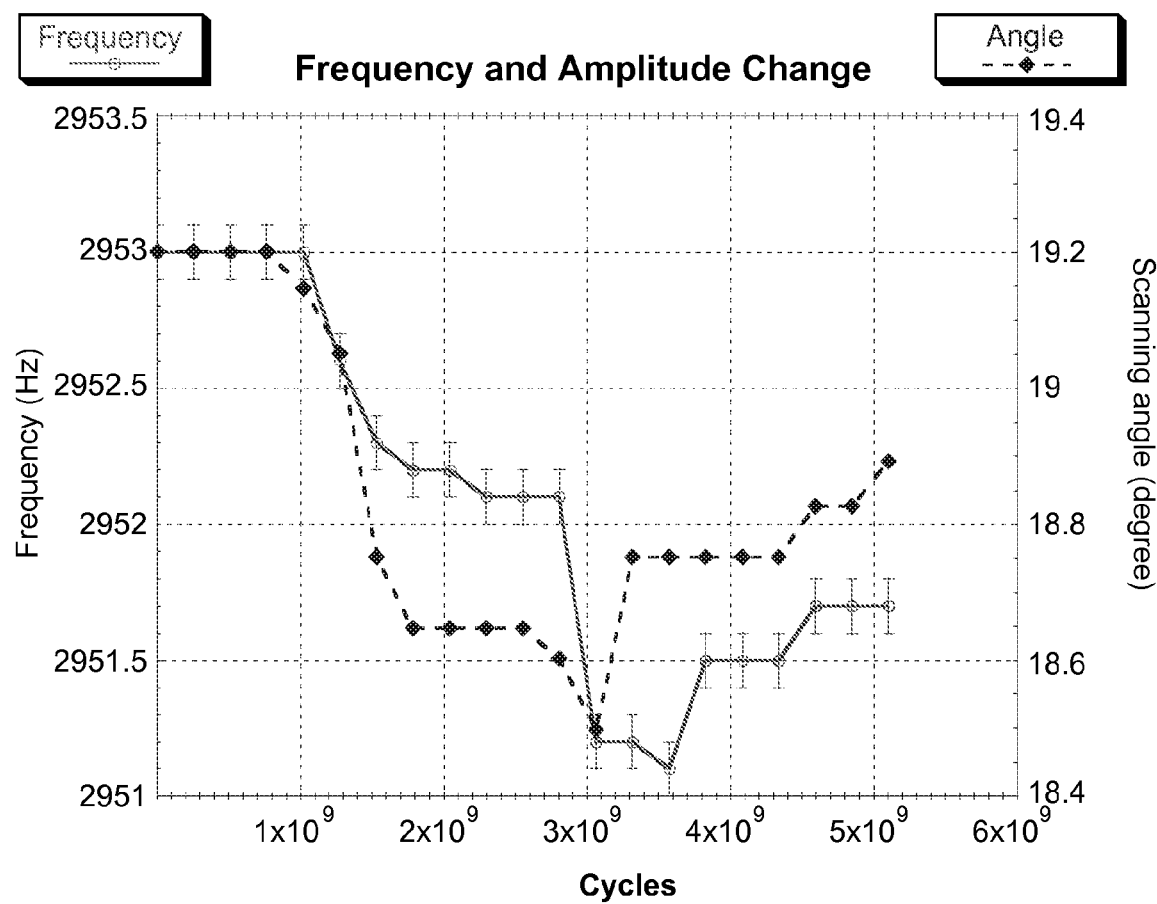
FIG. 9 is a graph illustrating measured scanning angle and resonant frequency of a microactuator over 5 billion cycles.
Figure 10:
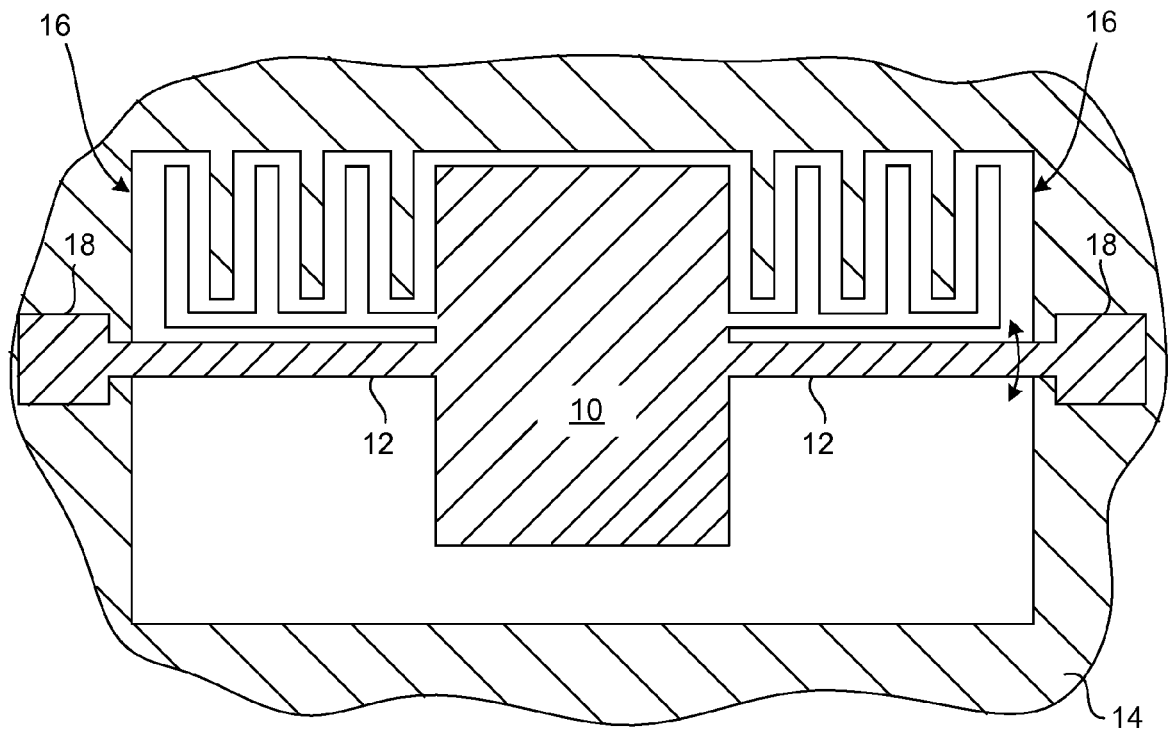
FIG. 10 is a plan view of a conventional angular vertical comb-drive (AVC) actuator.

The plastically deformed angular vertical comb actuator is exceedingly reliable and stable operationally because of its simple and rugged structure made of single-crystal silicon. To assess its long-term reliability, the actuator was resonated for more than 5 billion cycles using the same driving voltages as are indicated in FIG. 8. The resonant frequency and scanning angle change were measured periodically (every 255 million cycles) and these data are presented in FIG. 9. The maximum variations of resonant frequency and scanning angle were 0.064% and 3.6%, respectively. The error bars on the frequency curve are shown since the maximum scanning-angle change was undetectable to 0.2 Hz variation of the operational frequency.

Figure 11:
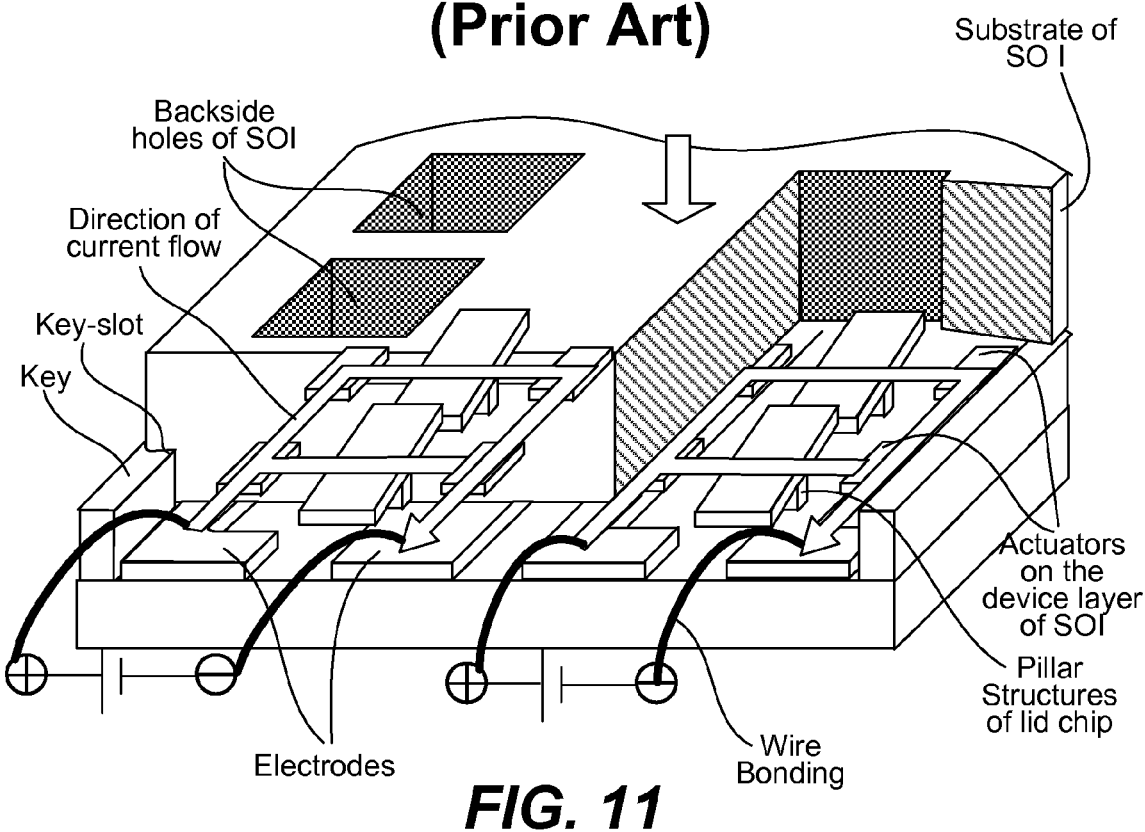
FIG. 11 is a perspective view of AVC actuators and localized heating in a batch for plastic deformation of torsional springs of the microactuators in accordance with an embodiment of the invention.

FIG. 11 shows schematically how, in another embodiment of the invention, the torsional springs are permanently deformed in a batch by localized Joule heating using micromachined silicon pillars and electrodes. The device chip (top) of 1 cm×1 cm and lid chip (bottom) of 1 cm×1.1 cm that is slightly larger than device chips for wire bonding are stacked together using self-aligned structures of key and key-slot pairs. When the pillar structure on the lid wafer pushes one edge of the mirror surface on the device chip, the mirror and moving combs rotate inducing stresses greater than am in the torsional springs by elastic deformation. With proper mechanical flexure designs, the magnitude of the stress in the mirror can be much smaller than $\sigma_m$ or $\sigma_f$ and negligible compared to that in the torsional springs. Electrical power is then applied from the external power source through the wires and electrodes on the lid chip, to anchor and torsion beams on the device chip. Since the torsional springs are designed to have more than 40 times larger electrical resistance value than other structures, only the torsional springs are reaching the temperature high enough to allow plastic deformation of silicon. Using this method, both the required stress level and high temperature are induced locally on the spring structures for self-aligned plastic deformation.

Figure 12:
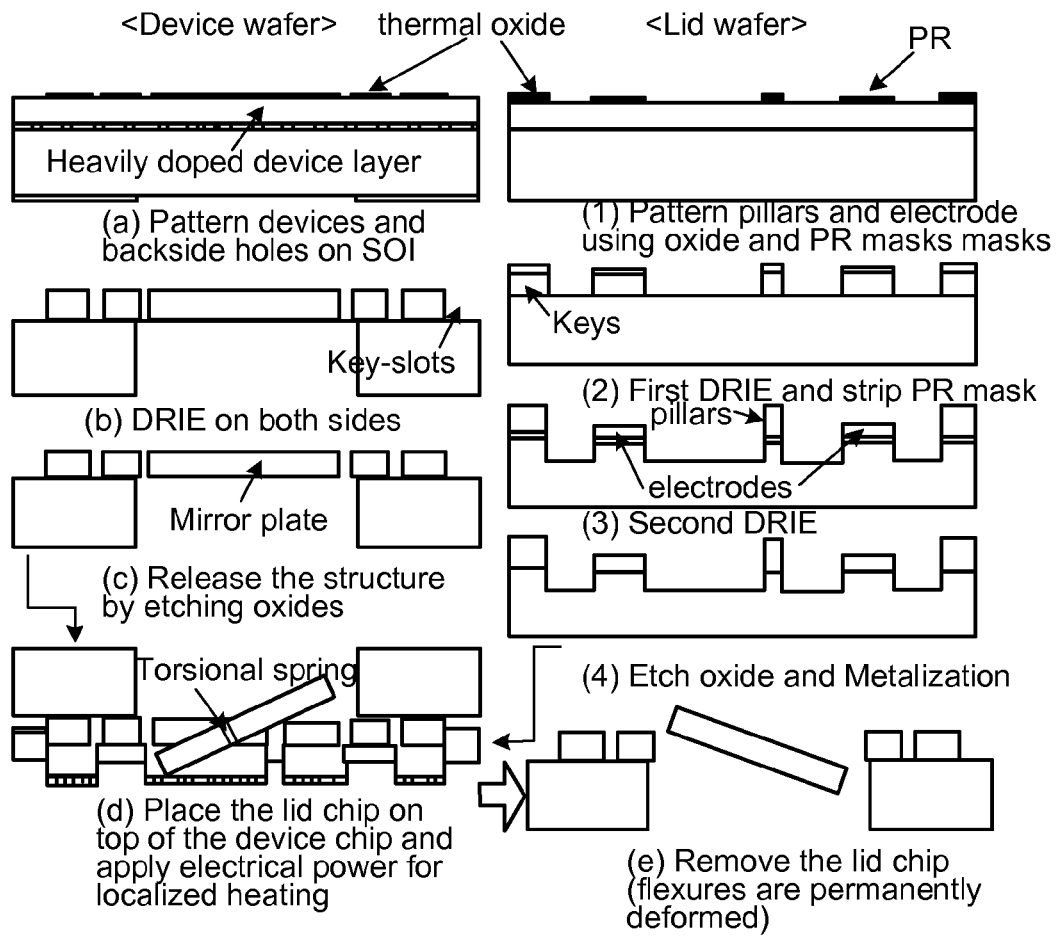
FIG. 12 illustrates process flow for batch processing of localized heating and plastic deformation in accordance with an embodiment of the invention.

The detailed fabrication process is explained in FIG. 12. To start the process, the comb actuators and mirror plates are initially defined on the same highly doped device layer of an SOI wafer in FIG. 12(a)~(c). During the DRIE (Deep Reactive Ion Etching) step, not only the actuator itself, but also the keyslots are formed. The backside etching of the substrate wafer underneath the mirror and combs removes sufficient silicon to provide clearance for the mirror motion. This backside alignment is not critical and even tens of microns of alignment errors are acceptable. A lid wafer is processed with keys that align to keyslots on the device wafer; pillars that displace the comb structures for desired tilt angles and electrodes that make electrical contacts with anchors on the device wafer to deliver electrical power in FIG. 12(1)~(3). The pillars are designed to be 40 im higher than the electrodes to allow adequate torsional displacements of mirrors during the localized plastic deformation process. The lid wafer is then put into HF to etch buried oxide to form undercut underneath the electrodes structures, with which, each electrode can be electrically separated after the following maskless metallization process. After dicing the device wafer into chips and stacking up those on top of lid chips (FIG. 12(d)), the following Joule heating process turns elastic strain into a plastic deformation. When they are separated, the comb actuators are permanently reshaped as shown in FIG. 12(e). Throughout the whole process, no critical alignment is necessary. Top and bottom combs are self-aligned because they are defined in a single masking step, and device and lid wafers are also self-aligned due to the keyslots and keys.

Torsional springs of scanning mirrors are typically designed to be beams with fixed-fixed boundary conditions with mirrors located at the center of beams. However, those beams with fixed-fixed boundary conditions may buckle in an uncontrollable manner in our process due to the thermal expansion. Our tests with fixed-fixed beams revealed that buckled beams could not recover their original shape in most cases, causing the misalignment between moving combs and fixed combs.

Figure 13:
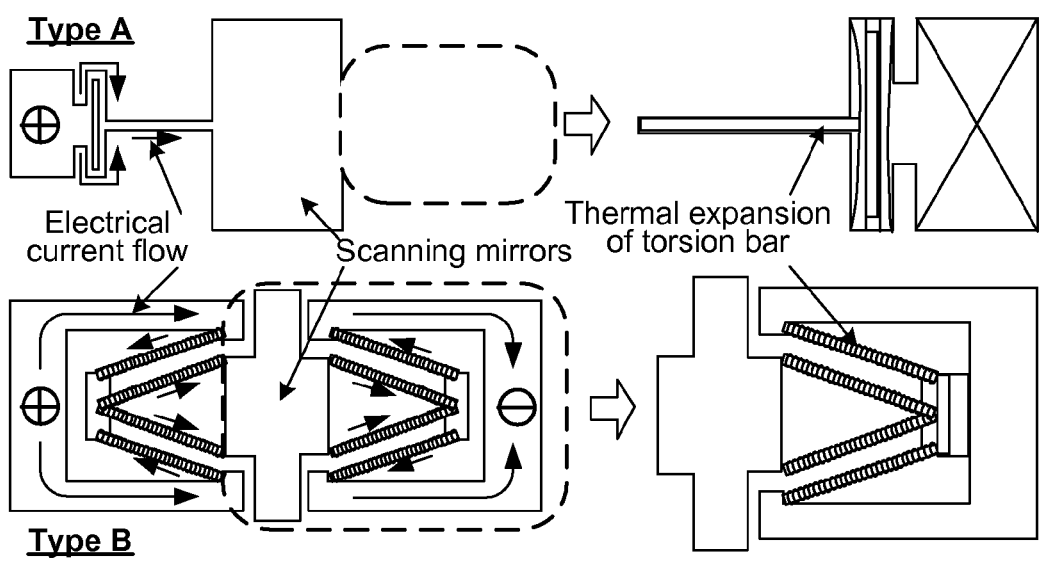
FIG. 13 illustrates two torsional springs for use in an AVC actuator in accordance with embodiments of the invention for relieving thermal stresses induced by localized heating.

FIG. 13 shows two improved torsional spring designs in accordance with the invention to relieve thermal stresses in the process. In type A, the lateral thermal strain is absorbed by perpendicular-beam springs at the end of the torsional spring. The geometrical symmetry of the design assures concurrent heating on both side of the mirror plate to maintain self-alignment during the plastic deformation. The dimension of the perpendicular-beam spring is designed from the buckling criterion of torsional springs. If the perpendicular-beam spring is too compliant, it may cause lateral misalignment of the two comb sets. If it is too stiff, it may not work effectively as a thermal stress absorber causing the buckling of torsional springs. Type B is an alteration of double folded beams designed to be flexible in torsion and stiff in lateral deflections. Each beam has the same dimension to have equivalent electrical resistances for the same heating and thermal expansion effects. here the double folded beam includes first and second beam members coupling the device structure to an apex and third and fourth beams coupling the apex to the support structures.

Figure 14:
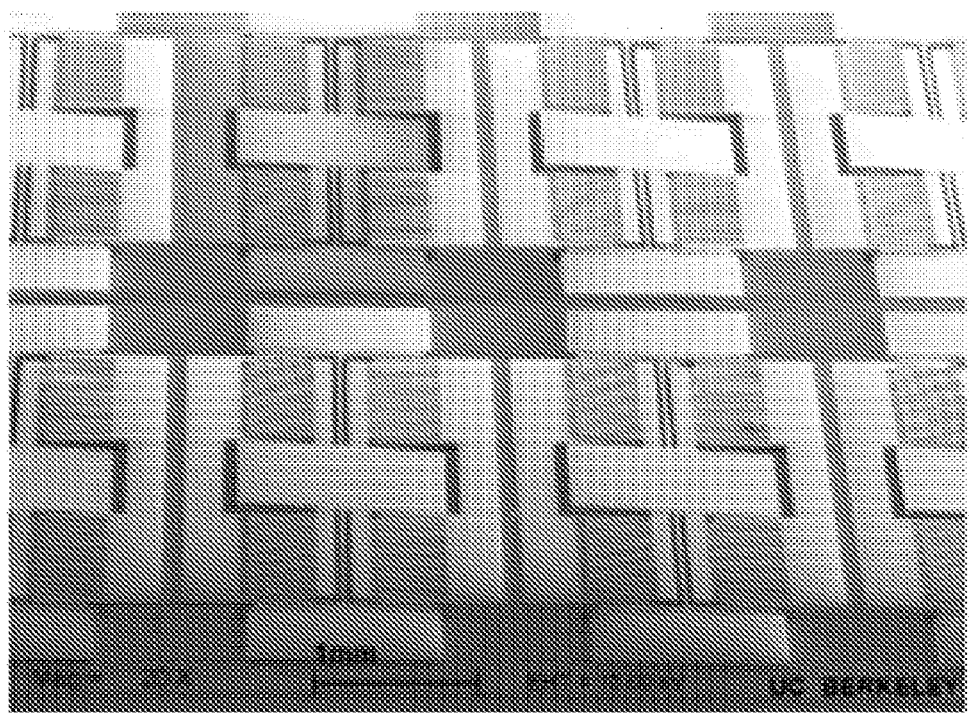
FIG. 14 is a picture of batch processed scanning mirrors using localized heating of torsional springs in accordance with the invention.
Figure 15:
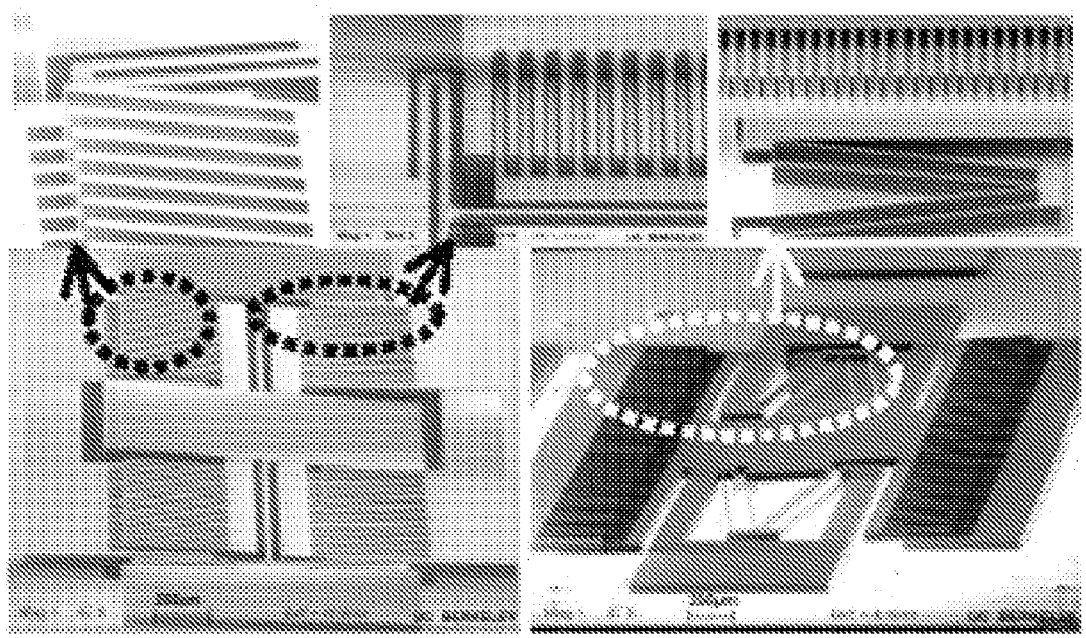
FIG. 15 is pictures of the torsional actuators of FIG. 13 and interdigitated self-aligned vertical comb fingers.

FIG. 14 is an SEM of 8 micromirrors produced in a batch by the process described above. Typically, there are 6~10 micromirrors on a chip depending on the dimensions of mirror and flexure. The close-up views of two different types of actuators are shown in FIG. 15. The lower-left picture is the type A design after the localized plastic deformation process with the upper-left picture showing close-up view of the offsetting vertical comb fingers and the upper-middle picture showing the close-up view of the, perpendicular-beam spring. The type B design is shown in the lower-right picture with the upper-right picture showing a close-up view of the double folded torsional spring.

Figure 16:
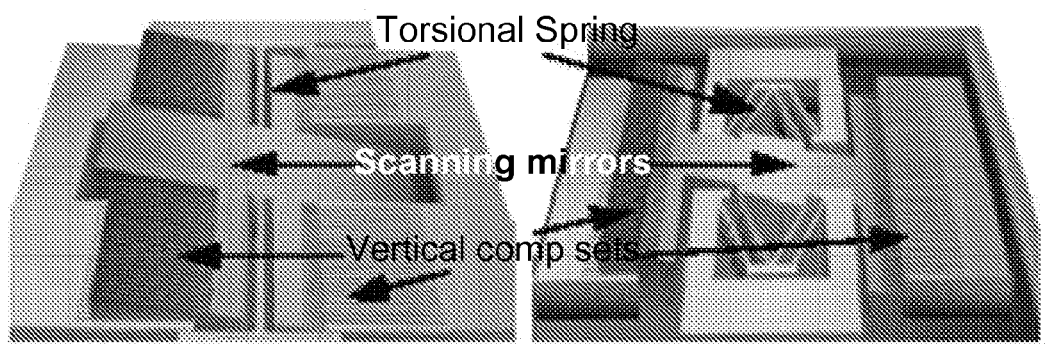
FIG. 16 further illustrates the two types of torsional actuators.
Figure 17:
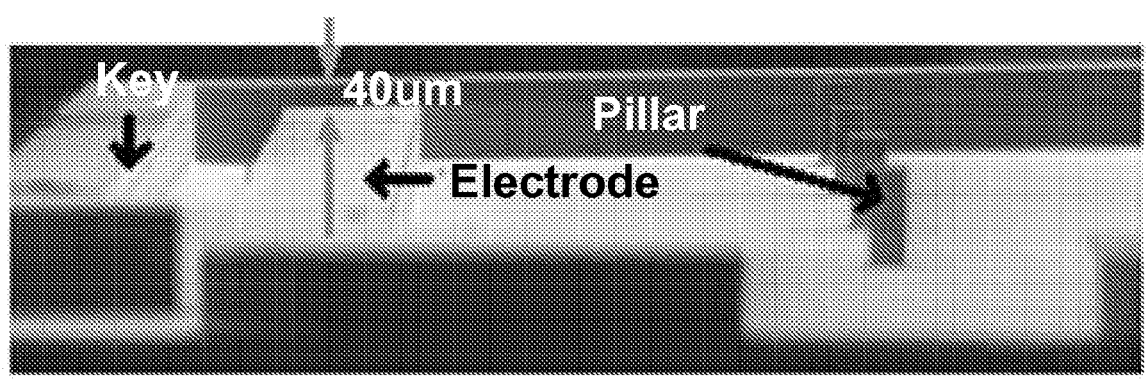
FIG. 17 illustrates micropillars and electrodes fabricated on a lid wafer in accordance with an embodiment of the invention.

A white light interferometric measurement after the plastic deformation is shown in FIG. 16, for two different designs. The measured radii of curvature of type A and B mirrors after localized plastic deformation were larger than 1.4 m and 2.0 m, respectively, representing excellent mirror flatness after the process. FIG. 17 is the side view SEM picture of the lid chip with pillars and electrodes used to deform the torsional springs. The top surface of pillars and keys are on the same level and the electrodes are 40 μm below them. No damage on the lid chips was observed indicating that the lid chips could be used repeatedly.

Figure 18:
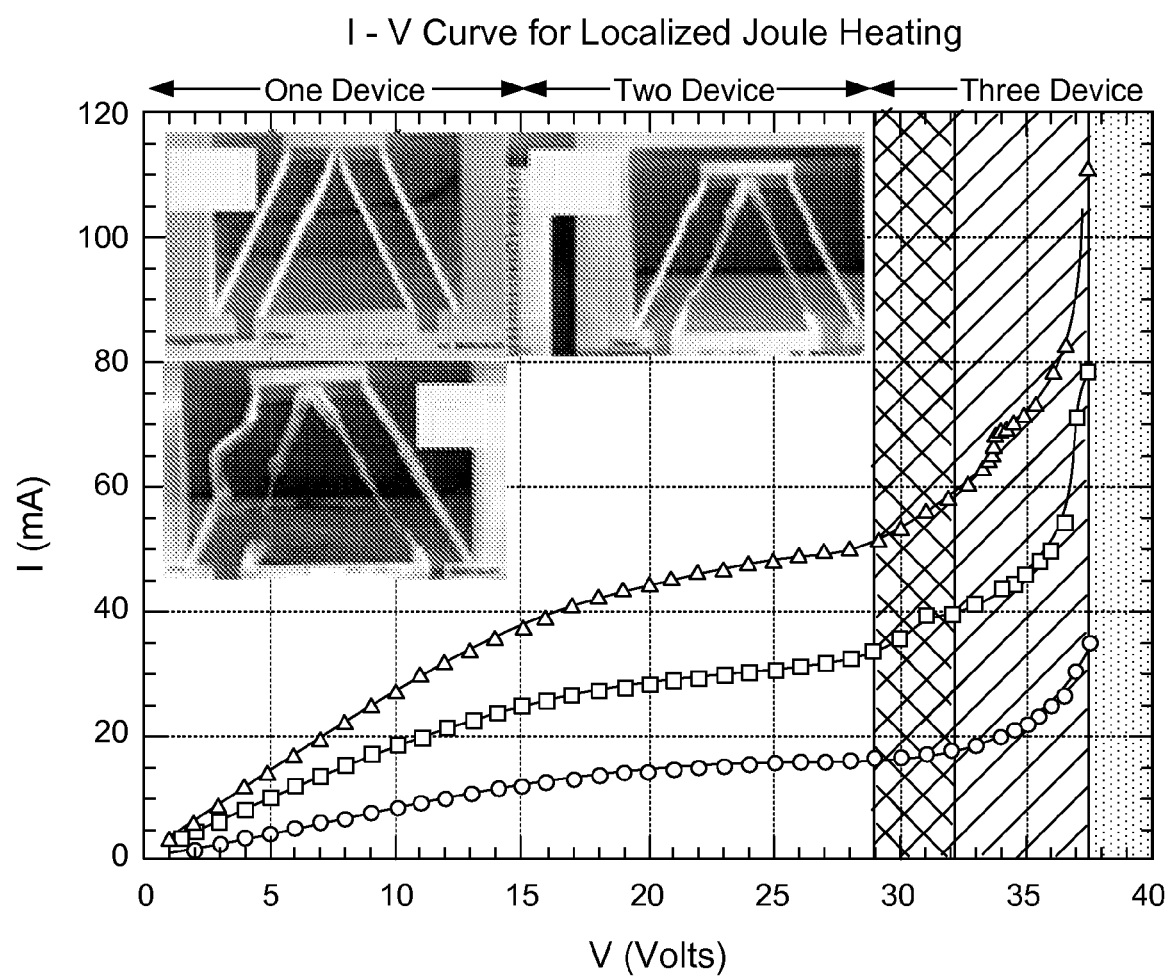
FIG. 18 is a graph illustrating I-V curve for localized Joule heating and pictures of springs corresponding to each heating zone.

FIG. 18 shows the appropriate range of power to induce plastic deformation on type B actuators by localized heating. Each of the three curves on the graph represents I-V measurements when one, two and three devices of the same layout are heated in order counted from the bottom curve. As shown in the plot, the amount of current flow for two and three devices processed at once is linearly proportional to the current of a single device, when the power is driven by constant voltage mode. This is due to the parallel connection of each device to the electrodes such that the current flowing on each device is same under the same driving voltage.

The I-V curves show linear characteristics under low power input. As the temperature increases from resistive heating, the resistivity of the heated silicon, which is a function of mobility and number of carriers, increases due to the decreased mobility showing the non-linear behavior in the IV plot. However the resistivity decreases when the temperature is very high, as the effect of increased number of carriers becomes dominant. Experimental tests on single crystal silicon show that best results (picture A and corresponding voltage range A in FIG. 18) are achieved at the power range of 500~600 mW/device, while higher power causes migration of silicon molecules resulting in degradation and non-uniform spring shapes (picture B and corresponding voltage range B) and eventually melting of structures (picture C and corresponding voltage range C). In all the aforementioned experiments, only a few seconds of power input was enough for plastic deformation. The dynamic performance of the actuators are measured and presented in FIG. 19. Data were collected using $30V_{dc}$ and 15Vpp drive on a type A actuator with 600 μm×720 μm×50 μm size mirror and 680 μm×10 μm×50 μm size torsional springs. The number of comb pairs of the actuator is 100 and the gap between fixed comb and moving comb is 6 μm. The resonant frequency is measured at 4132.6 Hz, and a maximum optical scanning angle of 47.3° is achieved. The quality factor measured is 202 in air.

Figure 19:
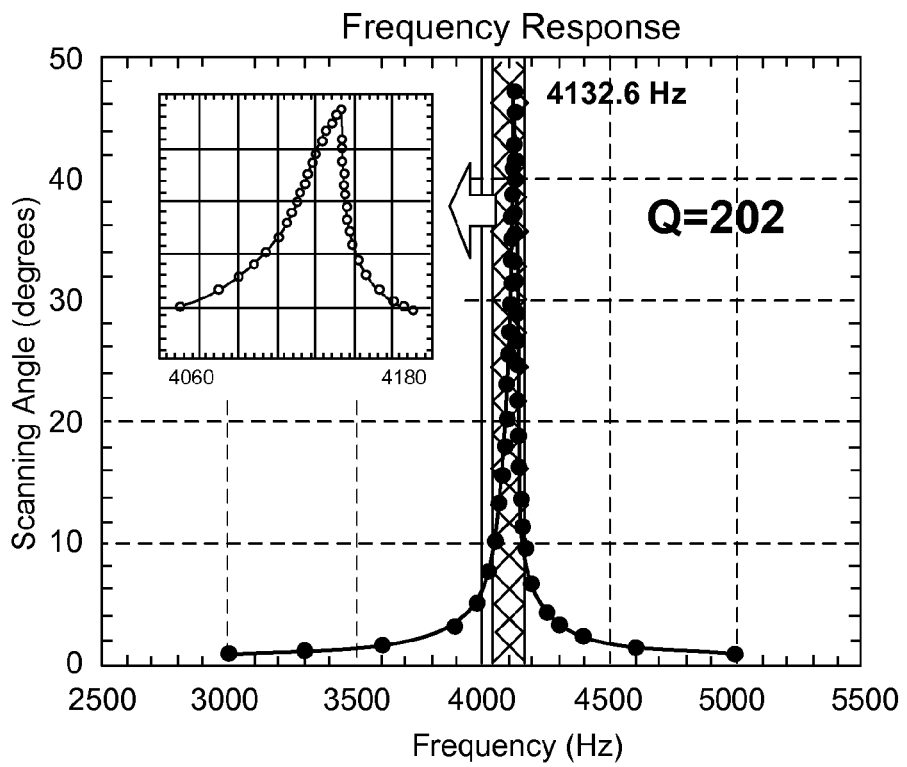
FIG. 19. is a graph illustrating frequency of response of a microactuator versus scanning angle.
Figure 20:
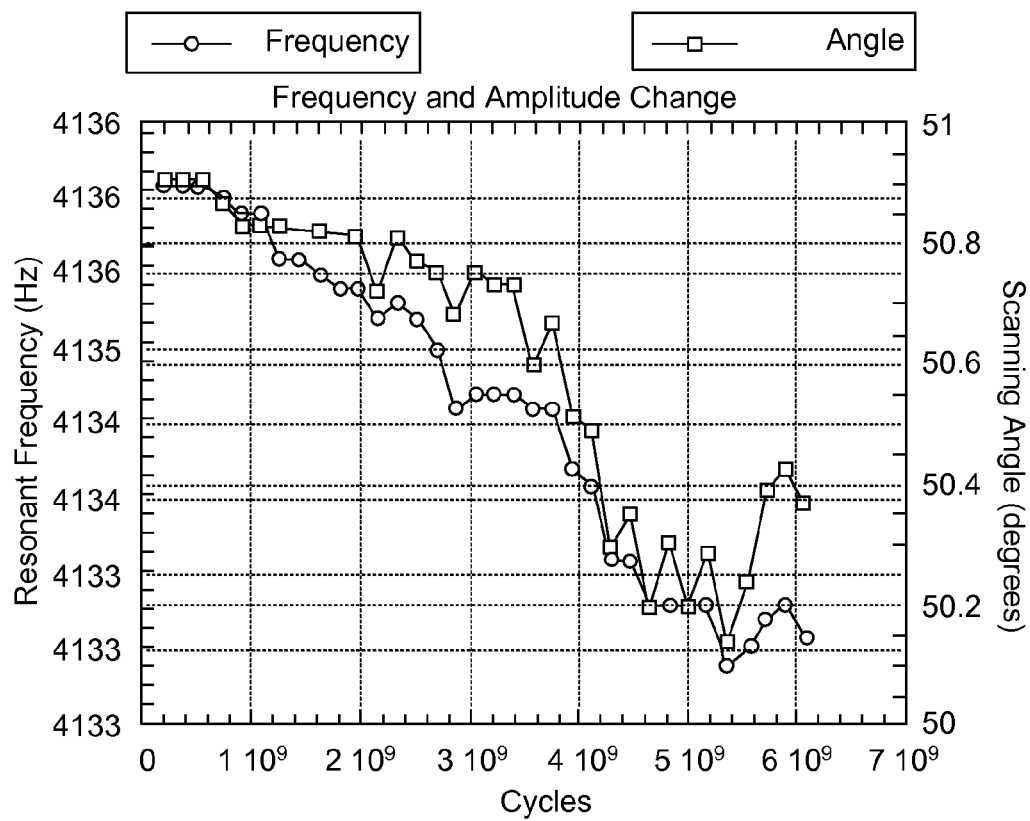
FIG. 20 is a graph illustrating measured scanning angle and resonant frequency of a microactuator over 6 billion cycles.

In FIG. 20, the reliability test results are presented for a type A actuator with the same dimension as the one tested in FIG. 19, but from different batch. The actuator was operated at its resonance for more than 5 billion cycles at the operation voltage of 30Vdc+14Vpp, and the resonant frequency and scanning angle were measured at every 178 million cycles which corresponds to 12 hours of operation. As shown, the measured initial scanning angle was 50.9° at the frequency of 4136.1 Hz. Overall, both frequency and scanning angle decreases slightly as the operation cycle increases. However, the variations of frequency and angle during the 6 billion cycles of continuous operation are smaller than 0.073% and 0.4% of their initial values, respectively. From the experiment, it was observed that both frequency and amplitude tend to change concurrently in the same incremental/decremental direction. It is not obvious if this variation is from the degradation of plastically deformed silicon material or from other possible effects such as humidity and temperature change or particle contamination, since the experiment was performed with a mirror actuator unpackaged and in the lab. However, considering the extremely small amount of variation, the scanning mirror actuators made by localized plastic deformation are robust and reliable.

Figure 21A:
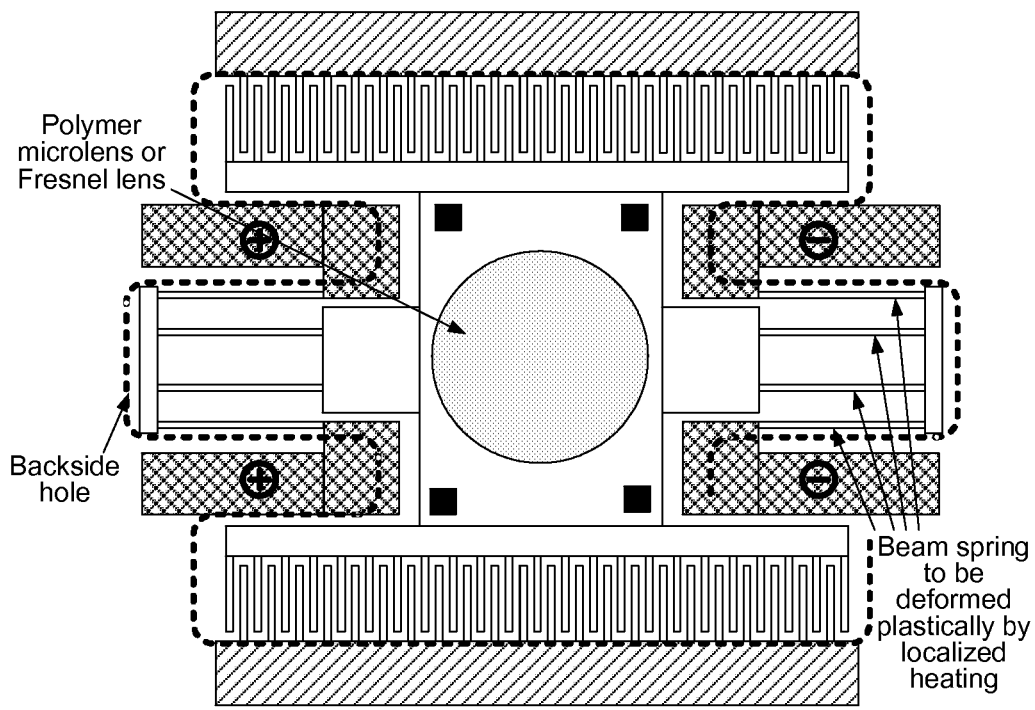
FIGS. 21A, 21B are plan views of two different vertically driven linear comb actuators in accordance with embodiments of the invention.
Figure 21B:
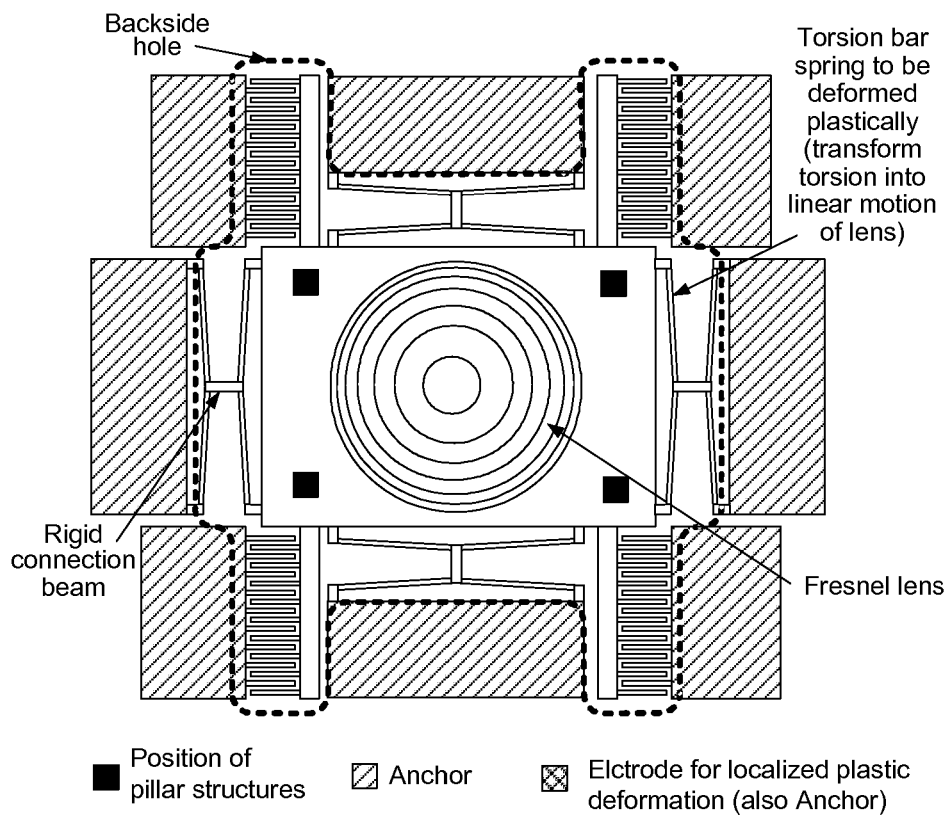

The previous examples of scanning micromirrors and variable capacitors are torsional actuators where torsion bars are plastically twisted to establish vertically interdigitated comb finger sets. If one changes the mechanical flexures to different designs, linear actuators moving in the z-direction can be made using the self-aligned plastic deformation process. In this case, the springs should be designed to have bending stresses larger than the yield stress at an elevated temperature. Unlike the angular vertical comb shape in torsional actuator, this will form staggered vertical comb (SVC) sets. FIGS. 21A, 21B show the top views of two design examples for vertically driven linear comb actuator. Both designs are for linear out-of-plane motion with interdigitated comb fingers and have either silicon Fresnel lenses or polymer lenses at the center, which is useful for a 3-D optical scanner or micro-optical systems that need vertical focal point adjustment of lenses. For stable linear motion, the mechanical flexures must be flexible only in the z-direction and stiff enough in other directions. The spring in FIG. 21A is a double folded beam modified from the typical surface micromachined comb-drive design—moving structures encloses the anchors. This design has all anchors on the perimeter of the comb structure to have a firm connection to the solid boundary but allows the comb-structure to move vertically when the backside hole is etched. Since one end of the double folded beam is not connected to the fixed boundary, it is free of thermal stresses for localized heating to relieve thermal stress. Therefore, only double folded beams are heated and plastically deformed for polymer lenses to be mounted by coating and lithographically patterning photosensitive polymers even before the plastic deformation process. This batch process of lens forming is possible only in the localized heating case. Patterned lenses may form perfect dome shape by reflowing them at temperatures lower than 200° C. The spring design in FIG. 21B is for global heating as described earlier. Four sets of springs are supporting the movable structure and each set is composed of two torsion bars and a rigid connection beam. The rotational motion of the torsion bars is transformed to translational motion through the rigid beam. The spring stiffness in z-direction can be easily adjusted by changing the length of rigid beam. The torsion bars are not completely straight and designed to be initially bent at the middle point, which increases in-plane stiffness.

FIG. 22 shows the fabrication process for a vertically driven linear actuator. It is similar to the plastic deformation process described for the torsional actuator, but the pillar structure deforms the linear spring in a z-direction (vertical direction). Multiple pillars on the lid wafer can be used to guarantee a flat surface of the structure where microlenses are located. After plastic deformation, the moveable structure generates linear translational motion in the out-of-substrate direction.

FIG. 23A illustrates a staggered vertical comb-drive, and FIG. 23B illustrates an angular vertical comb-drive. The linear actuator described here adopts SVC, while the torsional actuator described above can be actuated by either AVC or SVC. Both AVC and SVC can be formed by the plastic deformation processes with global heating or localized heating in accordance with the invention.

Plastic deformation of silicon by batch heating and by localized Joule heating was successfully applied to build micro scanning mirrors in a batch process that does not demand on any critical alignment steps. The novel designs for torsional springs prevent the buckling problem from non-uniform thermal expansion by localized heating. The optimal power range of localized heating was characterized and the measured dynamic performance of the actuator was recorded.

While the invention has been described with reference to specific embodiments, the description is illustrative of the invention and is not to be construed as limiting the invention. Various modifications and applications may occur to those skilled in the art with departing from the true spirit and scope of the invention as defined by the appended claims.

What is claimed is:

1. A vertical comb-drive actuator comprising:
   a) a support structure,
   b) a planar device structure,
   c) a plurality of torsion springs physically coupling the device structure to the support structure, the torsion springs being movable on deflecting the device structure in response to electrical actuation, each torsion spring having an end portion for joining the support structure which permits axial movement of the torsion spring in response to thermal expansion of the torsion spring during fabrication, said end portion further comprising double folded beams for coupling the device structure to the support structure, the double folded beams including first and second beam members coupling the device structure to an apex and third and fourth beams coupling the apex to the support structure.

2. The actuator as defined by claim 1 wherein the device structure includes a first plurality of combs and the support structure includes a second plurality of combs which are interdigitated with the first plurality of combs and which cooperatively drive the device structure in response to electrical actuation.

3. The actuator as defined by claim 1 wherein the actuator comprises semiconductor material.

4. The actuator as defined by claim 3 wherein the device structure and the torsion springs comprise doped silicon.

5. The actuator as defined by claim 4 wherein the actuator comprises a silicon on insulator substrate.

6. The actuator as defined by claim 4 wherein the device structure includes a first plurality of combs and the support structure includes a second plurality of combs which are interdigitated with the first plurality of combs and which cooperatively drive the device structure in response to electrical actuation.

7. The actuator as defined by claim 4 wherein the actuator comprises an angular vertical comb-drive actuator.

8. The actuator as defined by claim 4 wherein the actuator comprises a staggered vertical comb-drive actuator.

9. The actuator as defined by claim 4 wherein the actuator comprises a torsional actuator.

10. The actuator as defined by claim 4 wherein the actuator comprises a linear actuator.

* * * * *